United States Patent [19]

Gottwald

[11] 4,423,366
[45] Dec. 27, 1983

[54] MOTOR DRIVE

[75] Inventor: Johannes F. Gottwald, Park Ridge, Ill.

[73] Assignee: Xerox Corporation, Stamford, Conn.

[21] Appl. No.: 292,754

[22] Filed: Aug. 13, 1981

[51] Int. Cl.³ .......................................... H02K 29/04
[52] U.S. Cl. ...................................... 318/696; 318/685
[58] Field of Search .................. 368/157, 85, 217; 318/696, 685

[56] References Cited

U.S. PATENT DOCUMENTS

| | | | |
|---|---|---|---|
| 3,601,678 | 8/1971 | Abraham | 318/685 |
| 3,728,598 | 4/1973 | May | 318/696 |
| 4,107,593 | 8/1978 | Anderson | 318/685 |
| 4,208,623 | 6/1980 | Leehhouts | 318/696 |
| 4,300,223 | 11/1981 | Maire | 368/85 |
| 4,375,049 | 2/1983 | Grandchavin | 318/696 |

Primary Examiner—J. V. Truhe
Assistant Examiner—Saul M. Bergmann
Attorney, Agent, or Firm—Robert E. Cunha

[57] ABSTRACT

A stepper motor controller circuit is described. The circuit comprises four power transistors configured to drive current in either direction through a stepper motor winding. A series resistor senses instantaneous current and a chopper is used to limit this current to some predetermined maximum value. Eight diodes protect the circuit against reverse, current surges, and a flip-flop guarantees a minimum duty cycle.

8 Claims, 2 Drawing Figures

MOTOR DRIVE

This invention is a circuit for driving a stepping motor.

A stepping motor is commonly used to drive a shaft through a discrete angle for each reversal of current input to the motor windings. Thus, a stepping motor can be controlled to move through a small angle and stop or to run continuousy, depending on the input. The input is typically a pulse of current so that stepping motors lend themselves to applications where a digital processor is used as a controller.

The motor described in this application is used to control a typewriter carriage in a system having variable spacing. In this case, the carriage must be controlled to move a small but variable distance to the left, depending on the letter width, to reach the new position quickly but come to a complete stop before the font strikes the paper, and to slew from left to right at high speed between lines.

To accomplish these objectives, the motor must be capable of high torque, high speed, and accurate positioning while consuming a minimum of average power and maintaining good reliability. In addition, the cost must be low to achieve a reasonable price in the final product. A modern low cost electrical typewriter, for instance, would use four stepper motors to control the carriage, print wheel, ribbon and platen.

The most basic stepper motor circuit would use a series resistor between a pulse generator and the motor windings to limit current to a reasonable, value, but the power dissipated by this resistor would decrease efficiency. A better system would use a transistorized chopper circuit to drive the windings. A chopper circuit can be designed to control current to a predetermined level while maintaining high efficiency and peformance.

The stepper motor controller described herein comprises one driver circuit for each motor winding or phase, each circuit controlled by a timer, comparator and a digital processor, not described, which generates the original control signals. On the receipt of the appropriate input signal, the timer and control logic operate to produce current in a certain direction through one motor winding. This current is monitored by a comparator and the control circuit will be turned off when the current reaches a predetermined level. After a period of time determined by the timer, the circuit is ready to repeat the cycle.

The control system is a fixed frequency variable duty cycle system, to prevent generation of audible noise. Both phases are controlled by the same frequency so as to prevent the generation of beat frequencies between two phases, which could fall in the audible range.

The operation of this circuit will be described in detail in relation to the following drawings.

Figure 1:
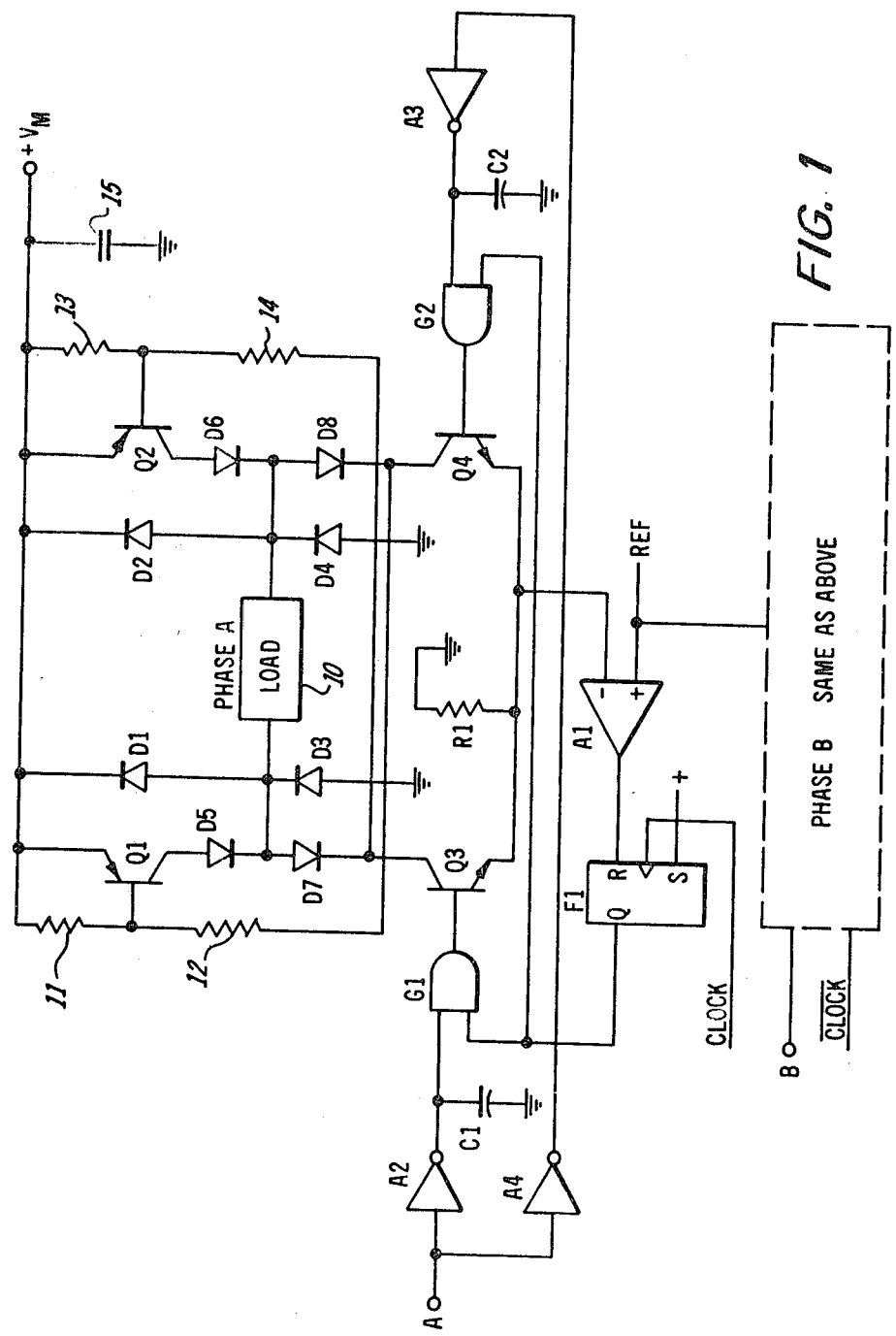
FIG. 1 is a simplified circuit diagram of the circuit.

In FIG. 1, the circuit for driving phase A of the motor is shown. The control signal, A, will be received from a digital processor or equivalent. Assuming this signal is high, then the application of this signal to the inputs of devices A2 and A4 will result in low levels at the outputs of devices A2 and A4, a high at the output of devices A3 and G2 turning on transistor Q4, and a low at the output of device G1 turning transistor Q3 off. Resistor 12 couples the low collector voltage of transistor Q4 to the base of transistor Q1, turning it on, and resistor 14 couples the high collector voltage of transistor Q3 to the base of transistor Q2, cutting it off. This results in current flowing from the power supply $V_M$ through transistor Q1, diode D5, the load 10, diode D8, transistor Q4 and current sensing resistor R1 to ground. By similar reasoning, if the state A input signal was low, current would flow through the load 10 in the opposite direction.

Because the load 10 is the motor winding and has significant inductance, this current flow rises over a period of time, creating a ramp-shaped voltage at resistor R1. This voltage is compared with a reference voltage, REF, at comparator A1. When the R1 voltage slightly exceeds this reference, comparator A1 will reset flip-flop F1, which turns off both gates G1 and G2, and thereby, transistors Q3 and Q4 as well as Q1 and Q2. The load current, however, continues to flow because of the winding inductance, through diodes D3 and D2, or D1 and D4, from ground to the power supply. Thus, during the off stage, the circuit gives power back to the power supply, increasing the circuit efficiency. During this time diodes D5, D6, D7, and D8 protect transistors Q1, Q2, Q3 and Q4 from this reverse voltage.

This off condition will continue until the next clock pulse is received at the set input of flip-flop F1 which restarts the cycle.

Figure 2:
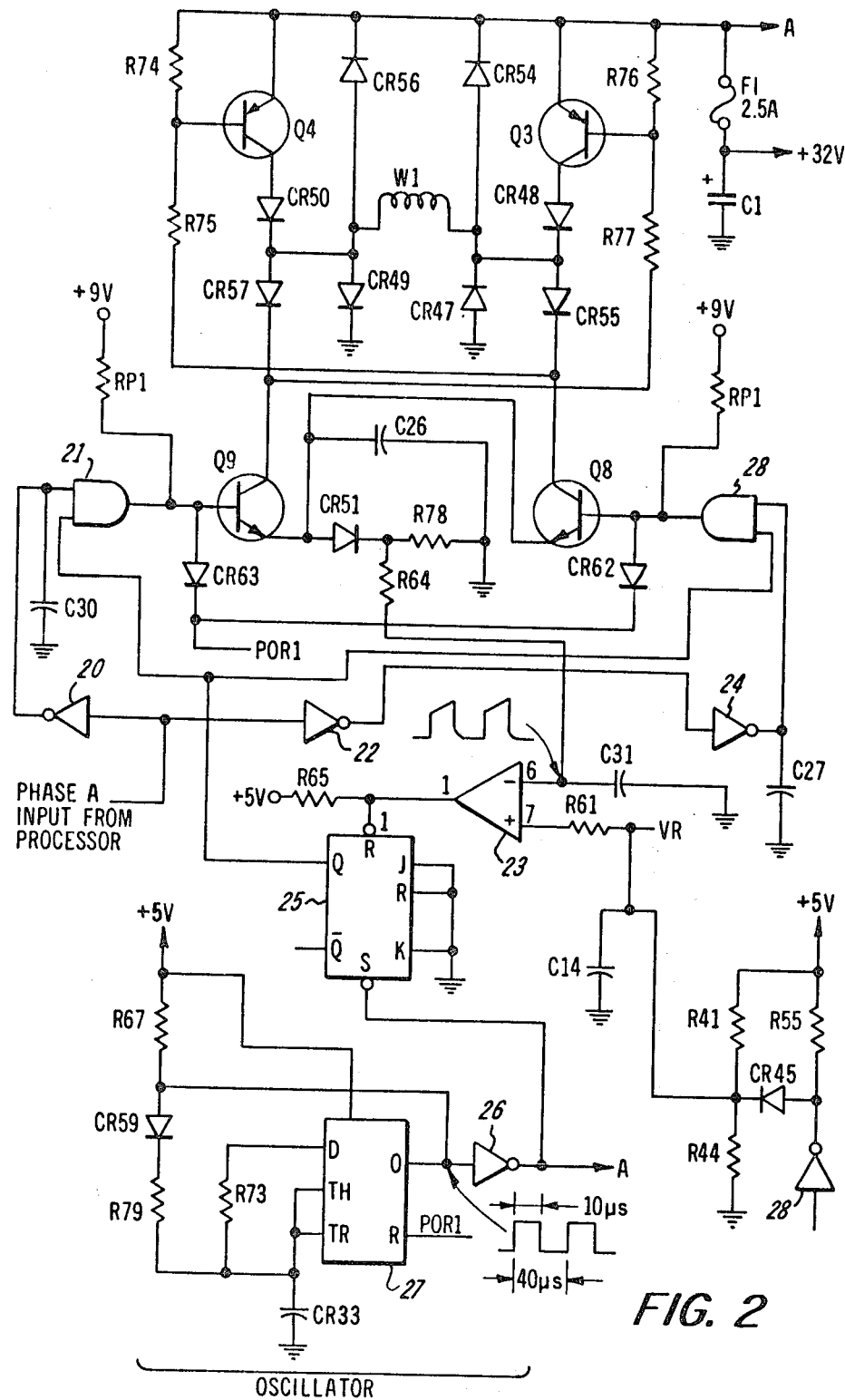
FIG. 2 is a schemtic diagram of the circuit.

The detailed schematic of this circuit is shown in FIG. 2. Four transistors Q4, Q3, Q9 and Q8 drive the phase A motor winding W1. During the time when these transistors are all cut off, the winding current continues to flow through diodes CR49, CR56, CR54 and CR47. The transistors are protected from the reverse voltage by diodes CR48, CR55, CR50 and CR57. The resistor voltage divider comprising resistors R74 and R75 (R76 and R77) couples the voltage from the collector of transistor Q8 (Q9) to the base of transistor Q4 (Q3) so that transistors Q4 and Q8 (Q9 and Q3) will operate simultaneously.

Capacitors C30 (C27) are provided to introduce a delay in a positive going transition and of the inputs to gate 21 (28) as a result of a change in the state of signal A. This delay insures that Q3 (Q4) is turned off, before Q8 (Q9) starts conducting, thus preventing a momentary short circuit from the supply via Q4, CR50, CR57, Q9 (Q3,CR4,CR5,Q8) to R78.

The phase A input signal from the processor is received at the inputs to devices 20 and 22 and is coupled through devices 21, 24 and 28 to transistors Q8 and Q9.

The load current through either Q8 or Q9 flows through sensing resistor R78 which generates a voltage applied to pin 6 of comparator 23, while pin 7 is supplied by the voltage reference circuit at the output of device 28 which generates a reference voltage, VR, of either 1.3 volts or 0.5 volts. Because sensing resistor R78 is one ohm, a current of either 1.3 or 0.5 amps will have to be reached before the comparator 23 will produce an output, resetting flip-flop 25, thereby shutting off transistors Q8 and Q9 through devices 28 and 21. The higher value of current, 1.3 amperes, is normally used, while the lower value, 0.5, is required when the carriage is stationary, that being enough current to hold the carriage in position.

The timer 27 output is a pulse of approximately ten microseconds every forty micro seconds and through device 26, sets the flip-flop 25 to start the next cycle. The resultant duty cycle is variable, while the frequency is fixed. That is, the timer sets flip flop 25 every forty microseconds, but the comparator does not reset it until a predetermined current level has been reached. In fact, when the motor is running at high speed, the counter emf of the motor can prevent the required amount of current from developing, resulting in the circuit being on continuously.

Under minimum load conditions, the duty cycle is forced by the clock generator 27 to be at least 25% to guarantee the stability of the system.

Fuse F1 is in the circuit to protect the remaining circuit from extensive damage in case of failure of any of the power transistors Q3, Q4, Q8, Q9.

The power supply need not be regulated since the current to the winding W1 is controlled by this circuit. In case of a failure in the supply feeding the inverters and gates, a signal, POR1, is coupled to transistors Q9 and Q8 through diodes CR62 and CR63 to shut off both paths of current to the winding to prevent over current in the winding.

The advantages of the resultant circuit are its efficiency, small heat dissipation and good cost/performance ratio; that is, for a rather low cost this circuit achieves very high regulated output power.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

What is claimed is:

1. A controller for driving a stepper motor winding comprising:
    first, second, third and fourth transistors,
    first, second, third and fourth diodes, said first and second diodes connected in series between said first and second transistors, said third and fourth diodes connected in series between said third and fourth transistors, said winding connected between the junction of said first and second diode and the junction between the junction of said first and second diode and the junction between said third and fourth diode,
    a resistor connecting said second and fourth transistors to ground,
    means for coupling said transistors so that either said first and fourth or said second and third transistors can be turned on at any point in time, and
    chopper means responsive to the voltage across said resistor for iteratively cutting off said transistors to limit the winding current.

2. A controller for driving a stepper motor winding comprising:
    first, second, third and fourth transistors,
    first, second, third and fourth diodes, said first and second diodes connected in series between said first and second transistors, said third and fourth diodes connected in series between said third and fourth transistors, said winding connected between the junction of said first and second diode and the junction between said third and fourth diode,
    a resistor connecting said second and fourth transistors to ground,
    means for coupling said transistors so that either said first and fourth or said second and third transistors can be turned on at any point in time,
    means for turning off all transistors when the voltage generated by said resistor exceeds a reference voltage,
    wherein said means for turning off comprises:
    a comparator, one input coupled to the junction of said resistor and said second and fourth transistors, one input connected to a reference voltage,
    a clock pulse generator, and
    a flip-flop which is turned on by said clock pulse generator and turned off by said comparator output when the voltage at the resistor exceeds said reference voltage, the output of said flip-flop coupled to said second and fourth transistors to cut off both of said second and fourth transistors when said resistor voltage exceeds said reference voltage.

3. The circuit of claim 2 further comprising a reference voltage generator which generates any one of a plurality of voltages for use as the reference voltage.

4. The circuit of claim 3 wherein said flip-flop is adapted to allow said clock pulse to over-ride said comparator output, and wherein said clock pulse generator output has a predetermined duty cycle so that said circuit will drive said winding at a duty cycle of at least that of said clock pulse generator output.

5. The circuit of claim 4 further comprising means for cutting off said second and fourth transistors if there is a failure of any power supply to prevent over current in said winding.

6. The circuit of claim 5 wherein said means for coupling comprises a second resistor connecting the base of said first transistor to said fourth transistor and a third resistor coupling the base of said third transistor to said second transistor.

7. The circuit of claim 6 further comprising a power supply connected to the remaining terminal of each of said first and third transistors.

8. The circuit of claim 7 further comprising fifth, sixth, seventh and eighth diodes, said fifth diode connected between one terminal of said winding and said power supply, said sixth diode connected from one terminal of said winding to ground, said seventh diode connected between the other terminal of said winding to said power supply, and said eighth diode connected from the other terminal of said winding to ground, to provide a path for current flow when the winding field is collapsing.

* * * * *